(12) United States Patent
Evans et al.

(10) Patent No.: US 6,616,737 B1
(45) Date of Patent: Sep. 9, 2003

(54) DESICCANT CARTRIDGE RETENTION DEVICE

(75) Inventors: John M. Evans, Piqua, OH (US); Glenn D. Perrine, Eaton, OH (US); David V. Flaugher, Beavercreek, OH (US)

(73) Assignee: Stanhope Products Company, Brookville, OH (US)

( * ) Notice: Subject to any disclaimer, the term of this patent is extended or adjusted under 35 U.S.C. 154(b) by 0 days.

(21) Appl. No.: 10/089,813

(22) PCT Filed: Aug. 16, 2000

(86) PCT No.: PCT/US00/40656
§ 371 (c)(1),
(2), (4) Date: Jul. 10, 2002

(87) PCT Pub. No.: WO01/24911
PCT Pub. Date: Apr. 12, 2001

Related U.S. Application Data
(60) Provisional application No. 60/158,284, filed on Oct. 7, 1999, provisional application No. 60/166,469, filed on Nov. 19, 1999, provisional application No. 60/185,234, filed on Feb. 28, 2000, and provisional application No. 60/185,235, filed on Feb. 28, 2000.

(51) Int. Cl.7 .......................... B01D 53/04; B01D 53/26
(52) U.S. Cl. ............................ 96/135; 96/147; 96/154
(58) Field of Search ................... 95/117–126; 96/117.5, 96/135, 137, 138, 142, 147, 149, 151, 153, 154; 55/DIG. 5, DIG. 17; 210/266, 282

(56) References Cited

U.S. PATENT DOCUMENTS

| | | |
|---|---|---|
| 2,873,856 A | 2/1959 | Jones |
| 3,799,352 A | 3/1974 | McClive |
| 3,879,292 A | 4/1975 | McClive |
| 4,436,623 A | 3/1984 | Cullen et al. |
| 5,034,039 A | 7/1991 | Goddard |
| 5,522,204 A | 6/1996 | Wood |
| 5,529,203 A | 6/1996 | Flaugher |
| 5,540,348 A | 7/1996 | Wood |
| 5,569,316 A | 10/1996 | Flaugher et al. |
| 5,580,451 A | 12/1996 | Tack |
| 5,716,432 A | 2/1998 | Perrine |
| 5,718,743 A | 2/1998 | Donnelly et al. |
| 5,910,165 A | 6/1999 | Haramoto et al. |
| 6,106,596 A * | 8/2000 | Haramoto et al. ............. 96/135 |
| 6,217,639 B1 * | 4/2001 | Jackson ....................... 96/134 |
| 6,309,450 B1 * | 10/2001 | Millen et al. .................. 96/131 |

FOREIGN PATENT DOCUMENTS

| | | |
|---|---|---|
| EP | 0732555 A2 | 9/1996 |
| EP | 0999421 A1 | 5/2000 |

* cited by examiner

Primary Examiner—Robert H. Spitzer
(74) Attorney, Agent, or Firm—Wegman, Hessler & Vanderburg

(57) ABSTRACT

A desiccant cartridge retention device used to secure desiccant cartridges (10) to fluid flow tubes (12) and/or canisters (14) of receiver/dryer and accumulator assemblies (78). Desiccant cartridge (10) includes a cup (16) extending along an axis (20) and having spaced inner and outer wall portions (18, 22) connected by a transverse portion (24) to define a chamber (26) having an opening (28) for receiving desiccant particles (30). The inner wall portion (18) defines a sleeve (36) having first and second openings (37, 38) and further comprises an outer surface (40) and an inner engagement surface (42). The sleeve (36) is adapted to receive and the inner engagement surface (42) is adapted to cooperate with fluid flow tube (12) such that the desiccant cartridge (10) is secured thereto forming a proper seal therebetween. Outer wall portion (22) includes a flange adapted to provide a snug compression fit within canister (14) such that the desiccant container (10) also is secured thereto. A cap (44) is secured to the cup (16) to secure the desiccant (30) inside the chamber (26).

14 Claims, 9 Drawing Sheets

DESICCANT CARTRIDGE RETENTION DEVICE

CROSS-REFERENCE TO RELATED APPLICATION

Priority filing benefit of International PCT application PCT/US00/40656 filed Aug. 16, 2000, and published under PCT 21(2) in the English language; U.S. Provisional Application Serial No. 60/158,284 filed Oct. 7, 1999; U.S. Provisional Application Serial No. 60/166,469 filed Nov. 19, 1999; U.S. Provisional Application Serial No. 60/185,234 filed Feb. 28, 2000; and U.S. Provisional Application Serial No. 60/185,235 filed Feb. 28, 2000.

BACKGROUND OF THE INVENTION

This invention relates to desiccant containing cartridges for use in receiver dryer or accumulator assemblies of automotive air conditioning systems. More specifically, it relates to desiccant cartridge retention devices used to secure desiccant cartridges to the fluid flow tubes and the canisters of these assemblies.

Although various forms of dryer assemblies have been suggested in the prior art, the types used in automotive air conditioning systems generally include an elongated receiver dryer or accumulator canister having inlet and outlet ports communicating with the interior of the canister. The outlet port generally consists of a fluid flow tube used to return the air or fluid flowing from the entry end of the canister to the exit end. The tube usually is positioned centrally within the canister. A desiccant cartridge holding desiccant particles is adapted to receive the fluid flow tube. The cartridge is positioned in the interior of the canister allowing for air or fluid to move through the desiccant particles.

It is important that the desiccant cartridge conform to the dimensions of the fluid flow tube as well as the canister in order to form a secure fit within the canister and to form a proper seal between the cartridge sleeve and the fluid flow tube, and between the cartridge and the canister. This task is made difficult due to manufacturing variations which produce canisters and fluid flow tubes with differing dimensions and sizes. As such, one must stock desiccant containers with various dimensions such that they properly can be fitted within these canisters and mounted on the fluid flow tubes. One obvious drawback with having to maintain a stock of desiccant cartridges having various dimensions is that inventory costs can become very expensive.

If a properly sized desiccant cartridge is not used, the cartridge will be able to move freely up and down inside the canister which can allow desiccant particles to shift and escape from the cartridge possibly resulting in damage to the air conditioning system. Further, an improper seal can cause leakage within the receiver/dryer or accumulator assembly or into the environment. Internal leakage can create icing within the air conditioning system, and environmental leakage can create a loss in fluid pressure as well as create potential health and environmental risks. As a result, an improper fit and improper seal can reduce the effectiveness of the air conditioning system.

In order to keep a desiccant cartridge secure within a receiver dryer or accumulator assembly and form a proper seal, desiccant cartridges must employ a retention device. Two types of retention devices used with today's desiccant containers involve the use of pal nuts or the use of springs. However, both pal nuts and springs increase the cost of manufacture of the assembly and add a secondary installation operation.

Accordingly, there is a need in the art to provide a universal size cartridge adapted to fit substantially all of the commercially available accumulator and receiver/dryer canisters and fluid flow tube assemblies.

There is also a need in the art to reduce mold and piece cost by providing one desiccant cartridge mold that will fit many different canister and tube sizes thereby eliminating other positional holding devices and reducing assembly costs.

Lastly, there is a need to allow customers to purchase just one size desiccant cartridge to fit a broad range of fluid flow tubes and canister sizes.

SUMMARY OF THE INVENTION

These drawbacks and others are overcome by means of the present invention embodied in a desiccant containing cartridge.

This desiccant cartridge includes a cup extending along an axis and having spaced inner and outer wall portions connected by a transverse portion to define a chamber having an opening and a cap for receipt in the chamber. The inner wall portion defines a sleeve having first and second openings and further comprises an outer surface and an inner engagement surface. The sleeve is adapted to receive and the inner engagement surface adapted to cooperate with a fluid flow tube such as a dryer tube so that the desiccant cartridge is secured to the fluid flow tube forming a proper seal therebetween. The outer wall portion of the cartridge further is adapted to cooperate with a receiver dryer or accumulator canister such that the desiccant cartridge may be secured thereto also forming a proper seal. A cap is secured to the cup to retain the desiccant inside the chamber. Both the cap and the transverse portion are perforated to allow air or fluid to reach the desiccant housed therein.

In one embodiment, the inner engagement surface of the inner wall portion of the cartridge has a midpoint intermediate the first and second openings, and the sleeve diameter tapers in a direction from the first opening toward the midpoint forming a narrowed opening at the midpoint such that the sleeve is adapted to receive and the midpoint is adapted to cooperate with a fluid flow tube whereby the desiccant cartridge is secured thereto by a snug compression fit between the reduced diameter section of the sleeve and the fluid flow tube forming a proper seal therebetween.

Another embodiment consists of the inner engagement surface comprising a continuous flange projecting radially inwardly intermediate the first and second openings, and a continuous flange projecting radially outwardly from the outer wall portion intermediate the cup opening and transverse portion. The inner engagement surface flange is adapted to cooperate with a fluid flow tube, and the outer wall portion flange is adapted to cooperate with a canister such that the desiccant cartridge is lockingly secured to the fluid flow tube and canister forming a proper seal therebetween.

Accordingly, it is one object of the invention to provide a universally sized desiccant cartridge adapted to receive a variety of fluid flow tubes such as a dryer tube and fit within a variety of receiver/dryer and accumulator canisters of varying dimensions such that the cartridge is secured thereto forming a proper seal therebetween.

It is another object of the invention to reduce mold and piece cost by allowing one desiccant cartridge mold to fit many different canister and tube sizes thereby eliminating other positional holding devices and reducing assembly costs.

The invention will be further described in conjunction with the appended drawings and following detailed description.

DETAILED DESCRIPTION OF THE PREFERRED EMBODIMENT

FIGS. 1–5 illustrate one embodiment of the desiccant cartridge having retention devices used to secure a universally sized desiccant cartridge 10 to fluid flow tube 12 (FIGS. 2 and 5) and receiver dryer or accumulator canister 14 (FIGS. 2 and 5) of varying dimensions thereby forming a proper seal therebetween.

Figure 1:
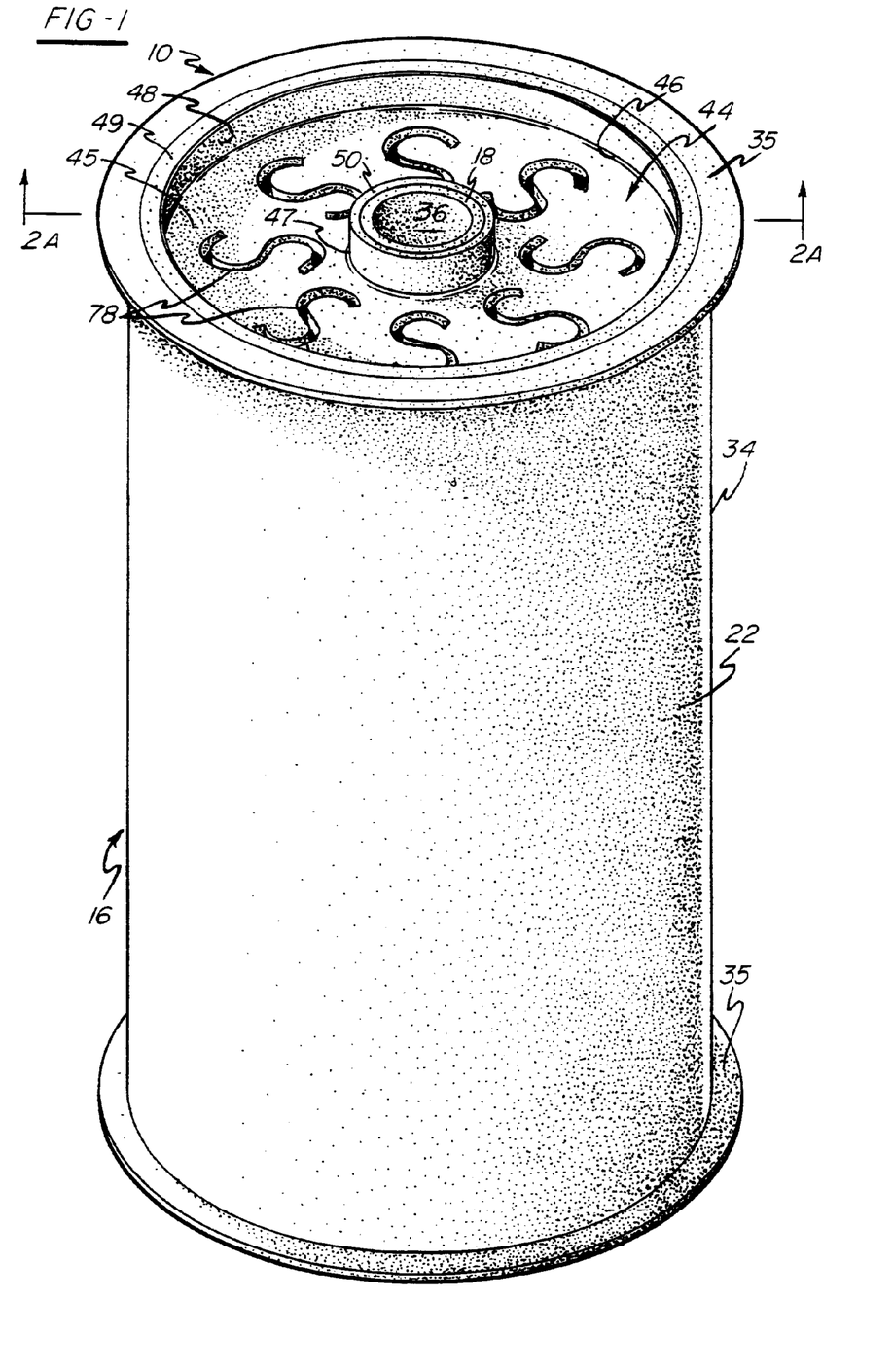
FIG. 1 is a front perspective view of a desiccant cartridge of the present invention.
Figure 2:
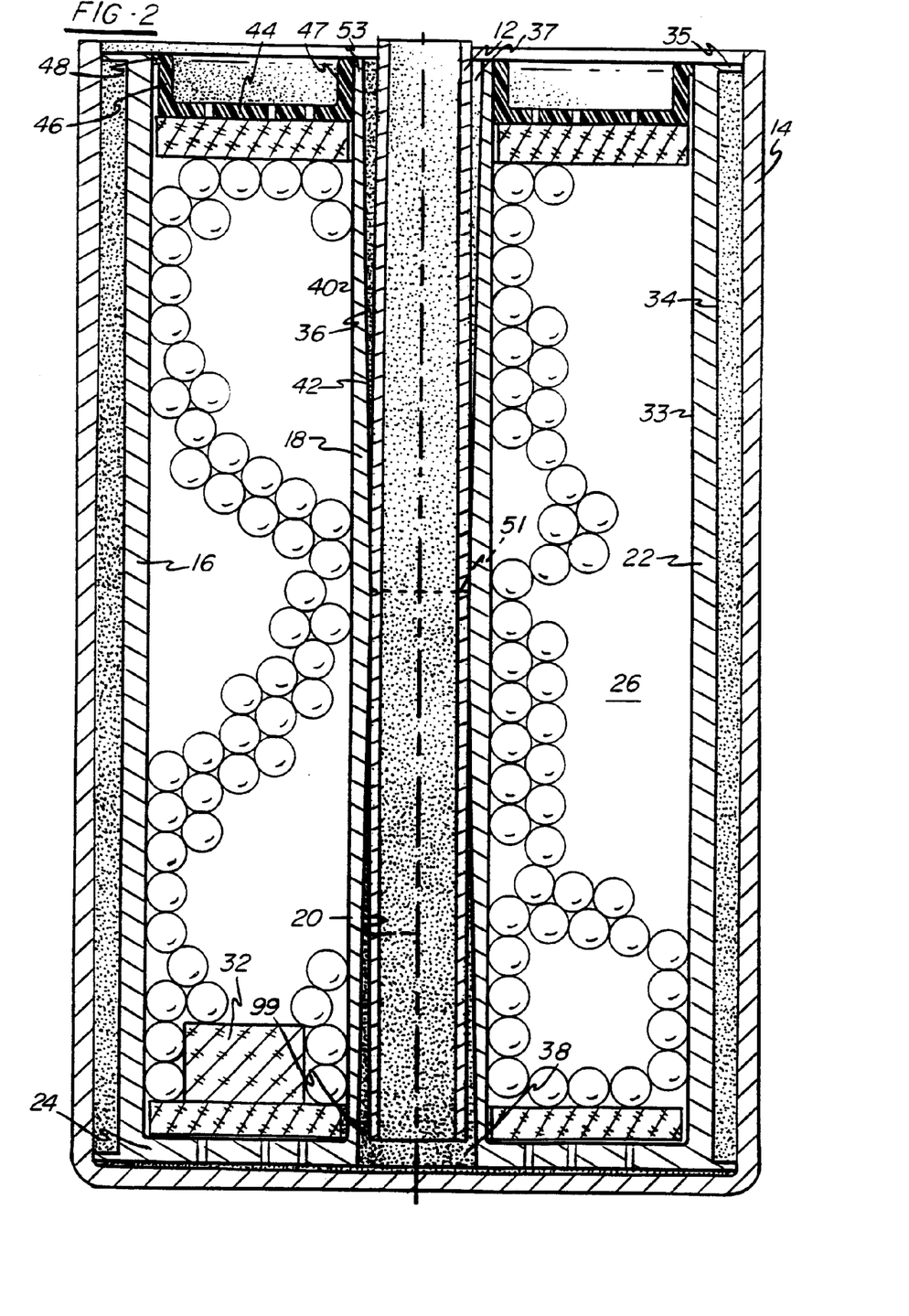
FIG. 2 is a cross-sectional view of the desiccant cartridge taken along the plane represented by lines and arrows 2A—2A in FIG. 1 installed in a canister of an accumulator or receiver dryer.
Figure 3:
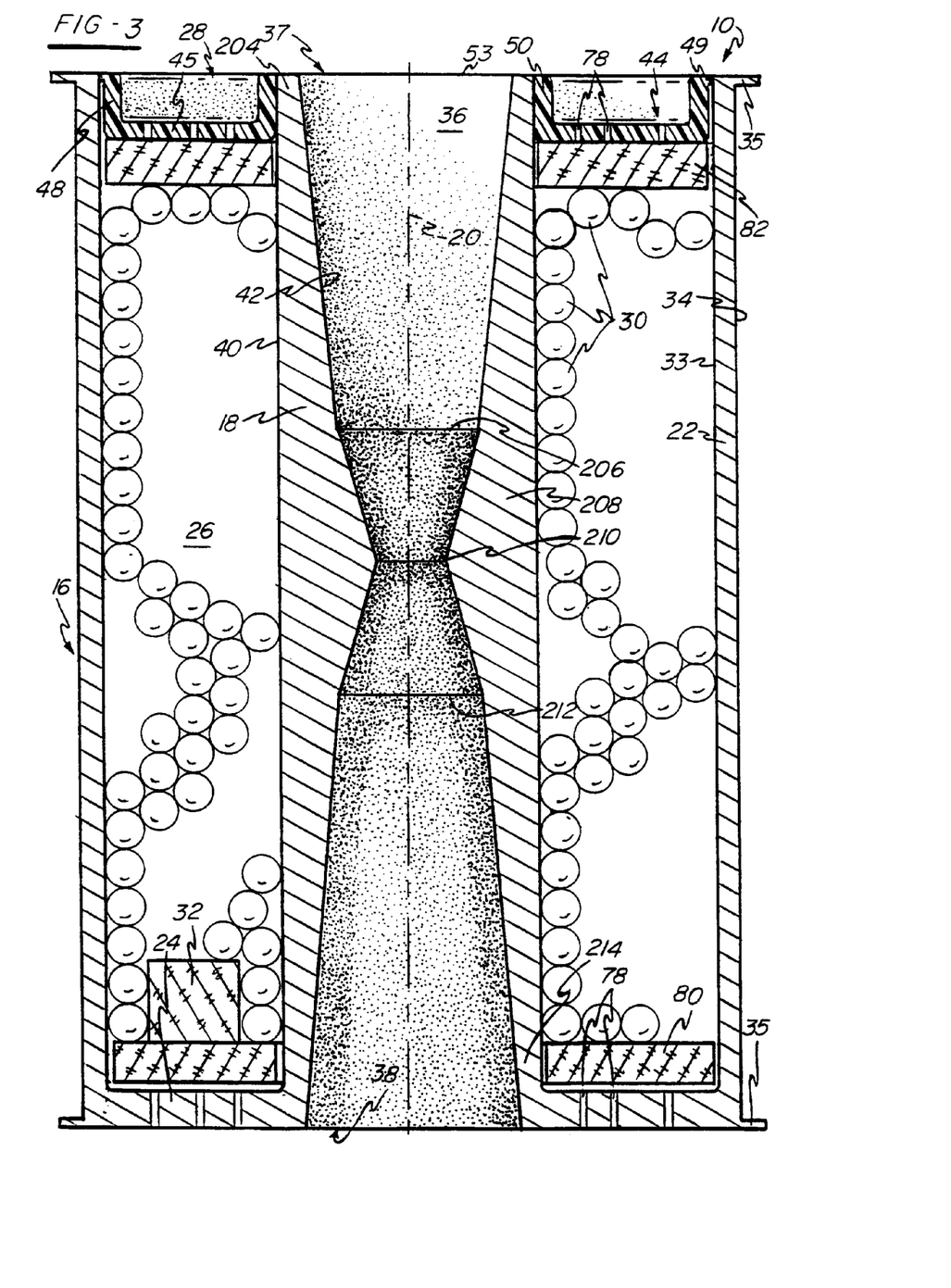
FIG. 3 is a cross-sectional view of another embodiment of a desiccant cartridge in accordance with the invention.
Figure 4:
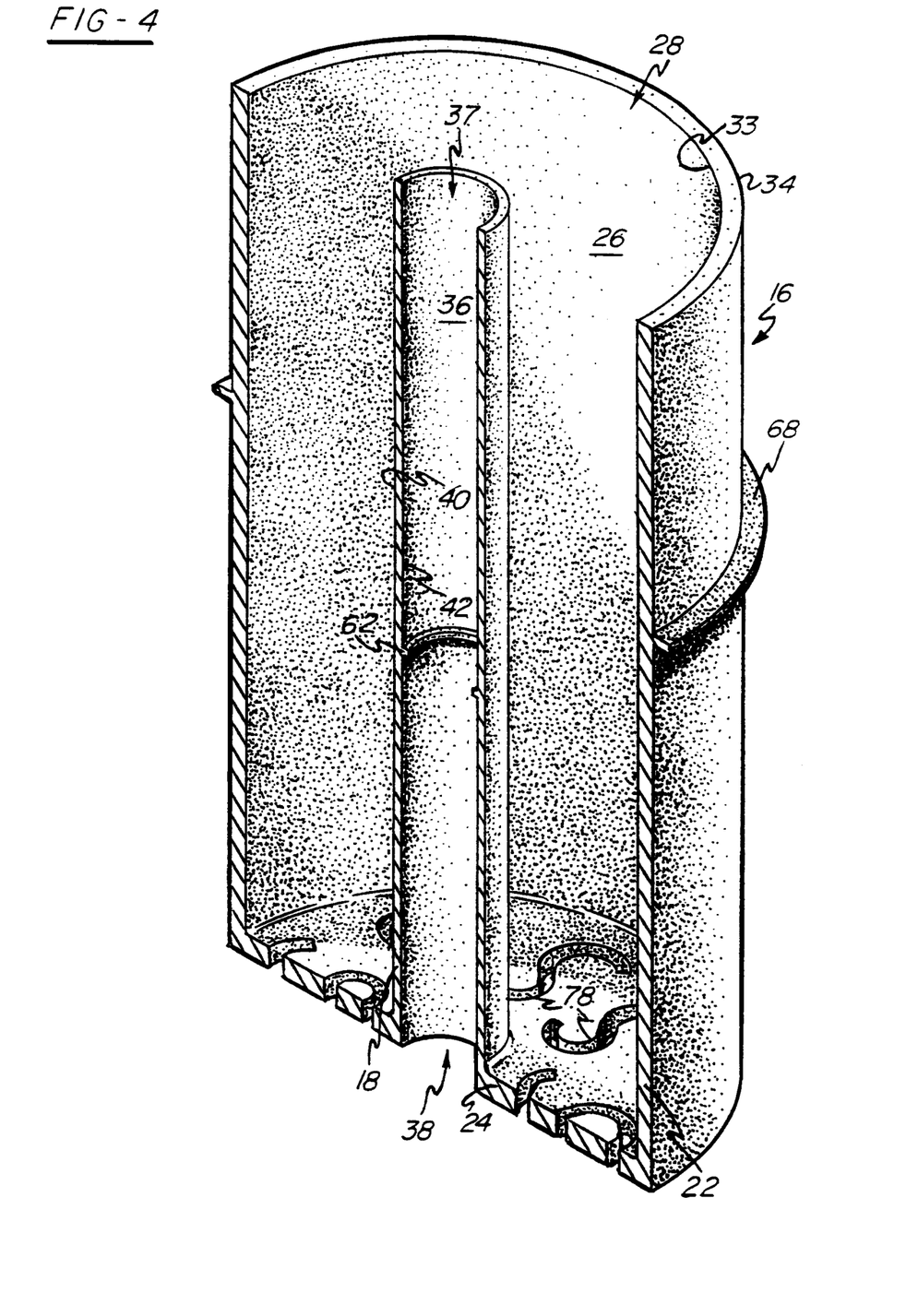
FIG. 4 is a cut away perspective view of another embodiment of a desiccant cartridge of the present invention.
Figure 5:
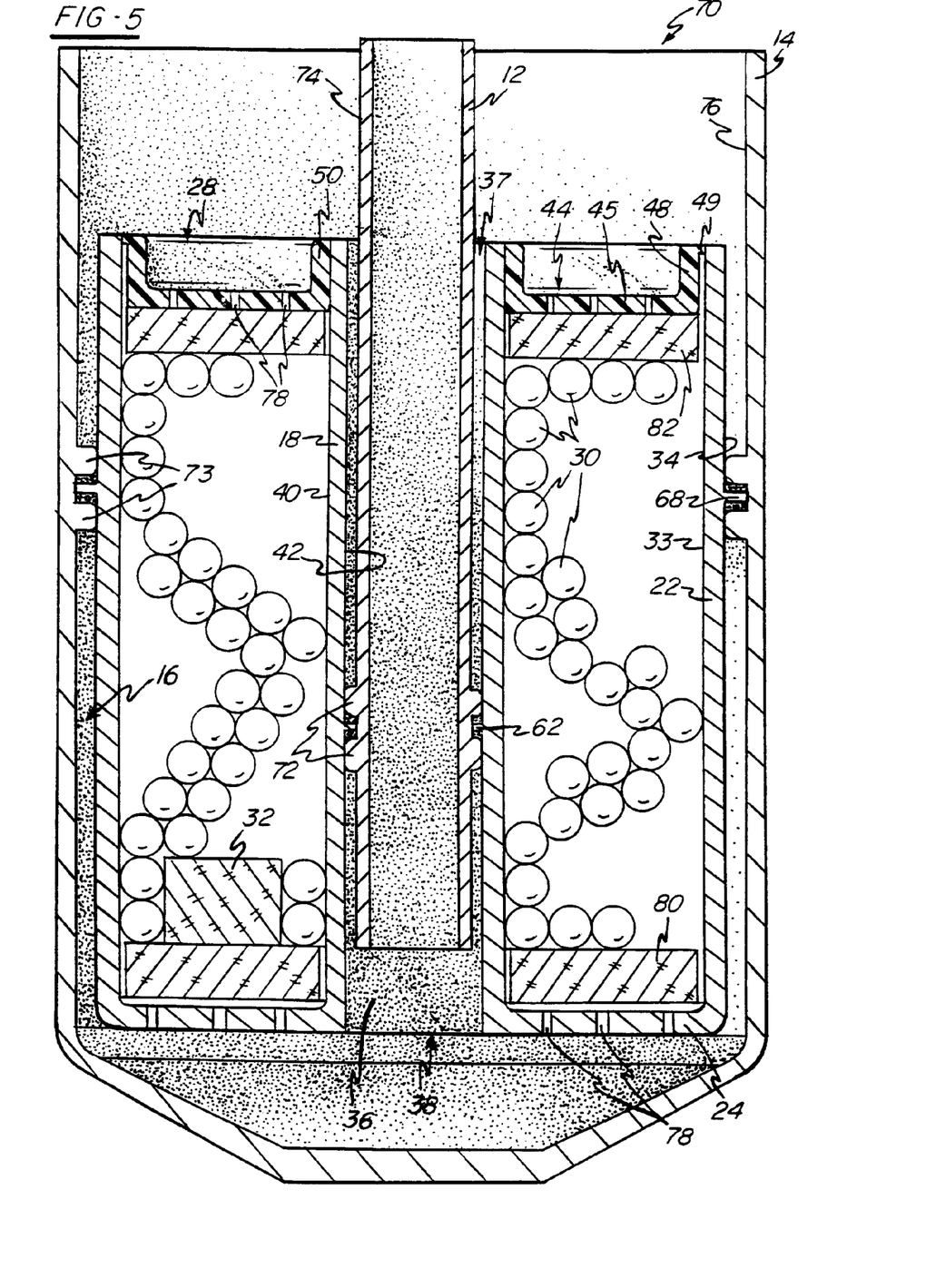
FIG. 5 is a cross-sectional view of a desiccant cartridge similar to that shown in FIG. 4 installed in a canister of an accumulator or receiver dryer.

In FIGS. 1–5, the cup 16 is a one-piece plastic molding which includes a cylindrical inner wall portion 18 extending along a central axis 20, a cylindrical outer wall portion 22 concentric with the inner wall portion 18, and a bottom defined by a transverse portion 24 which joins the inner wall portion 18 to the outer wall portion 22. As best shown in FIGS. 2, 3 and 5, the inner and outer wall portions 18, 22 and the transverse portion 24 cooperate to define a chamber 26 having an opening 28 for receiving desiccant particles 30. A leak detection dye in the form of a wafer 32, or the like, may also be placed within the chamber 26. The dye wafer 32 is used to identify leaks in the air conditioning system (not shown).

As best shown in FIG. 2, the outer wall portion 22 includes an inner and outer surface 33, 34 and can include at least one outwardly flared continuous lip portion 35. The flared lip portion 35 is adapted to resiliently fit, by a friction or interference fit within a dryer canister 14 of an air conditioning or refrigeration system (not shown).

In FIGS. 2–5, the inner wall portion 18 further defines a sleeve 36 having first and second openings 37, 38 and comprises an outer surface 40 and an inner engagement surface 42. The sleeve 36 of the inner wall portion 18 is adapted for receiving a fluid flow tube 12 (FIGS. 2 and 5) which communicates with an outlet port (not shown) of the air conditioning or refrigeration system (not shown).

In FIGS. 1–3 and 5, a cap 44 conforms to the circular shape of the cup 16 and has a planar portion 45 having an outer and inner circumference 46, 47 defining an aperture for receiving the inner wall portion 18 when the cap 44 is received in the chamber 26. The cap 44 further is provided with a peripheral flanged portion 48 extending transversely from the outer circumference 46 of the planar portion 45 and having a continuous edge portion 49, 50 which cooperates with the outer wall portion 22 and inner wall portion 18, respectively to retain the cap 44 to the cup 16. The artisan will appreciate that the cap can comprise a multiplicity of various features and dimensions and still conform to the cup such that it is secured thereto. Further, the inner surface 33 of the outer wall portion 22 of the cup may include a plurality of inner surface protrusions including, but not limited to, ribs, nibs, beads, bumps or other equivalent protrusions (not shown) projecting radially inwardly from the outer wall portion 22 which engage and retain the cap 44 in one of a number of axially spaced positions (not shown).

In a first embodiment, the inner diameter of the sleeve gradually tapers from the top of the sleeve to the midpoint of the sleeve proceeding along the central axis. Additionally, a similar taper is present between the bottom of the sleeve and the midpoint. Stated differently, the midpoint of the sleeve presents an i.d. that is smaller than the inner diameters of the top and bottom of the sleeve.

More specifically, midpoint 51 of sleeve 36 has an inner diameter that is, preferably, about 5% smaller than the inner diameter of the sleeve at the top 53 of the sleeve and about 5% smaller than the inner diameter of the sleeve as the bottom 99 of the sleeve. Accordingly, the sleeve 36 at this midpoint location forms a narrowed or venturi type opening adapted to snugly grasp a fluid flow tube therein.

The inner wall portion 18 of the sleeve 36 preferably is made from a thin walled, flexible material allowing the inner wall portion 18 to flex when receiving a fluid flow tube 12 (FIGS. 2 and 5). This flexibility allows compensation for variations in the diameters of a variety of tubes 12 (FIGS. 2 and 5) such that a cartridge 10 can maintain a proper seal therebetween and can be made from just one mold.

Another embodiment is shown in FIG. 3 wherein the sleeve is provided with a restricted inner diameter at an approximate mid point of the sleeve existing along the axis 20. Here, a taper is provided in the sleeve from the top 204 of the inner wall extending to an upper flange 206 of the venturi area 208. The throat 210 of the venturi has an i.d. that is smaller than the upper flange 206 and the top 204 i.d.

In the FIG. 3 embodiment, the wall dimension at 204 is x with the wall dimension (i.e., radial thickness of the inner tube) at 206 being 2x and the wall dimension at 210 being 3x, the bottom flange 212 of the venturi area has a wall dimension of 2x. Therefore the venturi section of the inner tube is defined by the boundaries 206, 212 with the throat 210 intermediate the boundaries and forming a narrowed constriction therebetween.

The extension from the bottom 214 of the inner tube extending upwardly to the lower flange 212 of the venturi may or may not be tapered. In the embodiment shown in FIG. 3, a taper is shown with the wall dimension at 212 being 2x and the wall dimension at 214 being x.

In another embodiment, as shown in FIGS. 4 and 5, the inner wall portion 18 defines a sleeve 36 having first and second openings 37, 38 and comprises an outer surface 40 and an inner engagement surface 42. The inner engagement surface 42 comprises a continuous flange 62 projecting radially inward intermediate the first and second openings 37, 38. Also, the outer surface 34 of the outer wall portion 22 further can be provided with a continuous flange 68 projecting radially outwardly intermediate the cup opening 28 and the transverse portion 24. Both of these flanges help ensure a snug fit of the cartridge along the fluid flow tube and within the canister.

As shown in FIG. 5, the flange 62 of the inner engagement surface 42 is adapted to cooperate with a fluid flow tube 12 and the flange 68 of the outer surface 34 of the outer wall portion 22 is adapted to frictionally engage the wall of the canister 14 such that the desiccant cartridge 10 is lockingly retained to the dryer tube 12 and to the dryer canister 14 forming a proper seal therebetween. This type of retention device permits the tube 12 to be received through either the first or second openings 37, 38 of the cartridge thereby allowing the container 10 to be received upside down within the canister 14.

The continuous flanges 62, 68 shown in FIG. 5 are made of a flexible material such as a polypropylene plastic thereby allowing the flanges 62, 68 to deflect but still maintain a proper seal. This flexibility provides compensations for variations in the diameters of tubes 12 and canisters 14 such that a cartridge 10 can be sized from one mold. Additionally, some dryer canisters 14 are welded shut after the desiccant cartridge 10 is inserted. This welding process can be problematic in that it may result in detrimental dimensional changes to the receiver dryer or accumulator assembly 70. However, the central location of the flanges 62, 68 provides enough distance from the weld area(s) to not be affected by the weld heat. The same holds true with regards to the centralized location of the tapered sleeve 36.

In the embodiment shown in FIG. 5, the flanges 62, 68 are shown to cooperate respectively with axially adjacent spaced-apart beads 72 contained on the outer wall 74 of the tube 12 and the beads 73 formed along the inner surface 76 of the dryer canister 14. However, the artisan will appreciate that the flanges 62, 68 are not limited to cooperating with any speed-apart beads 72 or 73 at all. Optionally the flanges may cooperate with spaced-apart nibs, ribs, bumps, or the like (not shown). The artisan also will appreciate that these flanges 62, 68 can be used alone or in conjunction with one another. Lastly, the artisan will appreciate that the location of the flanges 62, 68 and the beads 72, 73 can be switched such that the inner engagement surface 42 and outer surface 34 of the outer wall portion 22 comprise axially adjacent spaced-apart beads 72, nibs, ribs, bumps, or the like (not shown), cooperating with a fluid flow tube 12 and/or canister 14 containing continuous flanges 62, 68.

As shown in FIGS. 1–5, the transverse portion 24 of the cup 16 and the cap 44 are each perforated with a number of ports or perforations 78 so that the cap 44 and the transverse portion 24 are each permeable to the air or fluid (not shown) to be dried. As shown in the embodiment of FIGS. 1 and 4, the ports 78 of the cap 44 and transverse portion 24 are arranged in one concentric annular row such that a row has eight s-shaped ports 78. The precise arrangement and shapes of the ports 78 is not critical to the operation of the desiccant cartridge 10 as long as the desiccant 30 remains contained and air or fluid (not shown) is allowed to enter the cartridge 10, interact evenly with the desiccant 30, and exit from the cartridge 10.

As shown in FIGS. 2, 3 and 5, plies 80, 82 of a permeable lining material, such as felted polyester or gauze can be placed inside the chamber 26 near the transverse portion 24 and the cap 44 to trap the desiccant 30 in the cartridge 10. The plies 80, 82 must be permeable to the air or fluid (not shown) to be dried but impermeable to the particulate desiccant 30.

When the desiccant cartridge 10 is charged with the particulate desiccant 30, the first ply 80 of the permeable lining material can be inserted by sliding it down the inner wall portion 18 until positioned adjacent the transverse portion 24. The required amount of desiccant 30 is poured therein. A dye wafer 32 also may be placed into the chamber 26. Once the desiccant 30 is charged, the second ply 82 of the permeable lining material can be slid down the inner wall portion 18 against the desiccant 30. The cap 44 is then inserted into the chamber 26 and urged downwardly toward the transverse portion 24 until it abuts against the charged desiccant 30.

Once the desiccant container 10 is assembled, it is inserted into an accumulator or receiving dryer canister 14 as shown in FIGS. 2 and 5. The cup 16 may be vibrator or bowl fed to a robotic arm (not shown) for automatic installation into the canister 14. The outer wall portion 22 cooperates with the inner surface 76 of the dryer canister 14 while the dryer tube 12 is inserted into the sleeve 36 to secure the container 10 thereto forming a proper seal therebetween. The desiccant container now is properly secured within the canister 14 such that it does not move up and down or allow air or fluid to leak.

Figure 6:
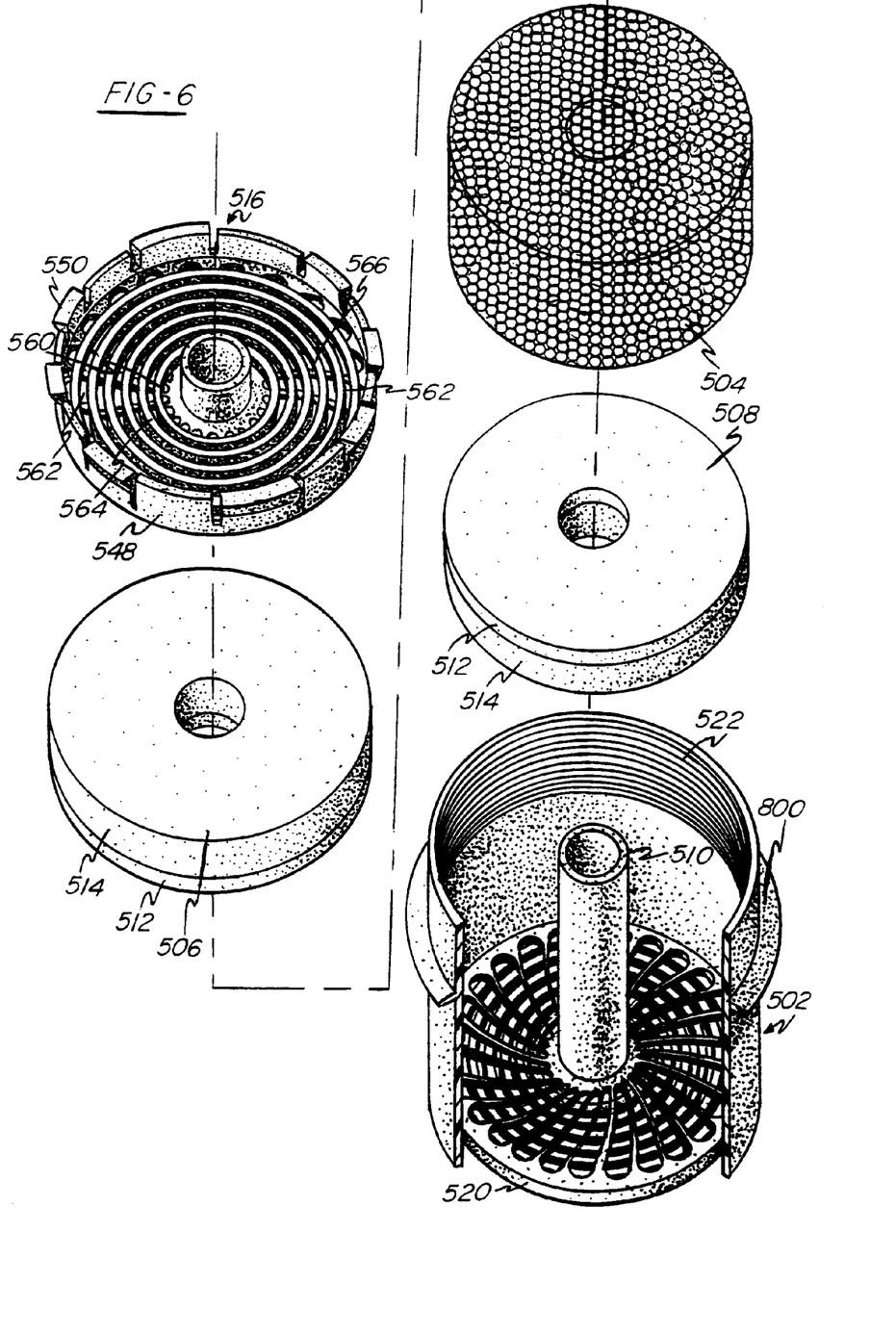
FIG. 6 is an exploded perspective view of the preferred cartridge and cap construction in accordance with the invention.
Figure 7:
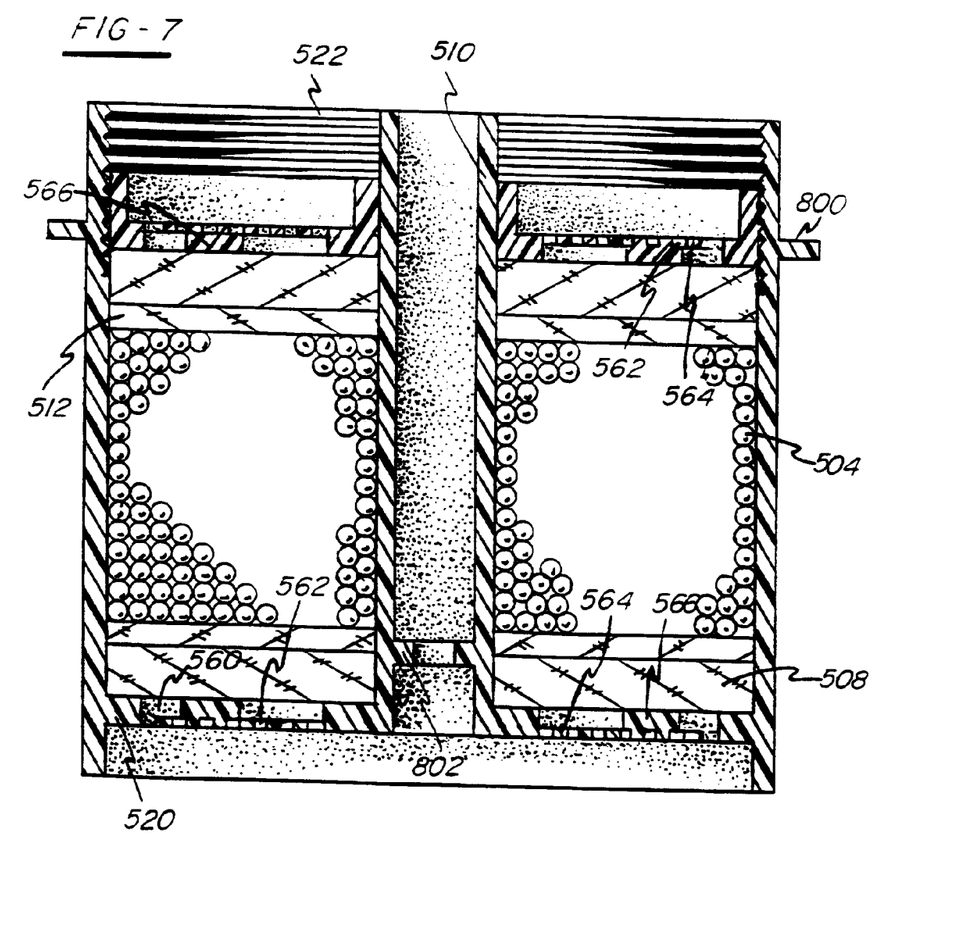
FIG. 7 is a cross sectional view taken along a plane dissecting the axis of the cartridge and cap combination shown in FIG. 6.

Turning now to the preferred embodiment shown in FIGS. 6–10, and with specific reference to FIGS. 6 and 7, cup 502 is composed preferably of polypropylene, although polyester may also be mentioned as another polymer that may be used. Desiccant material 504 is interposed between dual density fiberglass laminates 506, 508 on the center axially disposed tube 510 of the cup.

The laminates 506, 508 are composed of a high density layer 512 and low density fiberglass batting layer 514 that have been laminated together via hot bonding or other bonding techniques. These laminates are available from Johns Manville under the Tuff Skin designation.

The desiccant material 504 comprises beads that are commercially available from Universal Oil Products under the XH7 designation.

The lid 516 comprises a plurality of lock tabs 550. Bottom 520 of the cup comprises a multiplicity of openings therein that roughly correspond in shape and size to those provided in the lid.

The lid is snugly and adjustably mounted in the i.d. of the cartridge. The position of the lid along the axis of the cartridge may be varied. Accordingly, the lid may be snugly secured over a host of different desiccant volumes that may be provided in the cup.

The interior diameter of the cup or cartridge may be provided with an uneven, roughened surface texture 522 as shown by generally parallel ridges or grooves to increase the friction between the outer periphery of the lid and the cartridge walls. Bumps or other protrusions may be formed along the cartridge walls for this purpose.

As best shown in the FIG. 6 drawing, the circumferential wall or skirt 548 of the lid that is adapted to fit snugly with the inner wall of the cartridge is provided with a plurality of lock tabs 550 that are spaced from each other around the skirt. Each of the lock tabs protrudes radially outwardly from the skirt relative to the radial dimensions of the skirt. The tabs are composed of a flexible plastic and, in effect, provide a spring like action as they are compressed for sliding, positioning or mounting along the cartridge axis. The locking tabs cooperate with the textured inside of the cartridge to provide adjustable, friction mount of the lid along the axis of the cartridge. An annular flange 800 is provided around the circumference of the cup and is composed of a flexible resistant plastic. The flange provides a snug fit within the surrounding canister or housing (not shown). Also, the inner tube includes restricted diameter portion 802 that serves to provide a snug mount of the cartridge over the fluid flow tube (see FIG. 7).

FIG. 7 also shows the preferred dimensional relationship between the flange 800 and restricted diameter portion 802 along the length (axial dimension) of the cup. Preliminary observations indicate that the cartridge is firmly secured in the canister and readily withstands torsional stress and vibration when the outer flange 800 is located along the length of the cup at a spaced distance from top of the cup and wherein the restricted diameter portion 802 is positioned on the inner tube at a spaced position from the bottom edges of the cup. More specifically, if the length of the cup, X, is 1 unit, then the flange 800 should be spaced from the top of the cup at a distance of about 0.2–0.35(X). The restriction 802 will be positioned at a distance of about 0.2–0.35(X) from the bottom of the cup.

It is even more preferred if the flange 800 is spaced at a distance of about 0.25(X) from the top of the cup with the flange 802 spaced at a distance of about 0.25(X) from the bottom of the cup.

As shown, the cap is provided with a multiplicity of oblong, petal shaped apertures 560 generally disposed with their major axes radially extending from the inner tube 510 toward the circumference of the cap. Superposed over the array of the petal shaped apertures are a plurality of concentric, annular openings 562. The openings 562 are narrower than the width or minor axes of the openings 560.

The structure thus provides two levels of aperture depths. The first level is defined by the openings 562 and the solid concentric rings or ridges 564 that separate neighboring openings 562. The second level is defined by the generally oblong apertures 560 and the generally radially extending ridges 566 separating neighboring openings 560 from each other.

The surface area provided by the sum of the openings 560 is greater than the sum of the areas of the openings 562. This allows for the desired fluid flow volume through the cap, while the relatively narrow openings between the ridges 564 still serve to retain desiccant beads in the cup enclosure.

Similarly, the bottom 520 of the cup is also provided with this bi-level arrangement of openings wherein the relatively large petal shaped openings 560 are provided adjacent the fiberglass filter laminate 508 and while the annular openings 562 are provided under the array of openings 560 on the bottom side of the cup. Once again, the large surface area provided by the openings 560 will permit the desired volumetric flow of fluid through the cup with the narrower openings 562 serving as a retention cage to minimize desiccant loss through the bottom of the cup.

Figure 8:
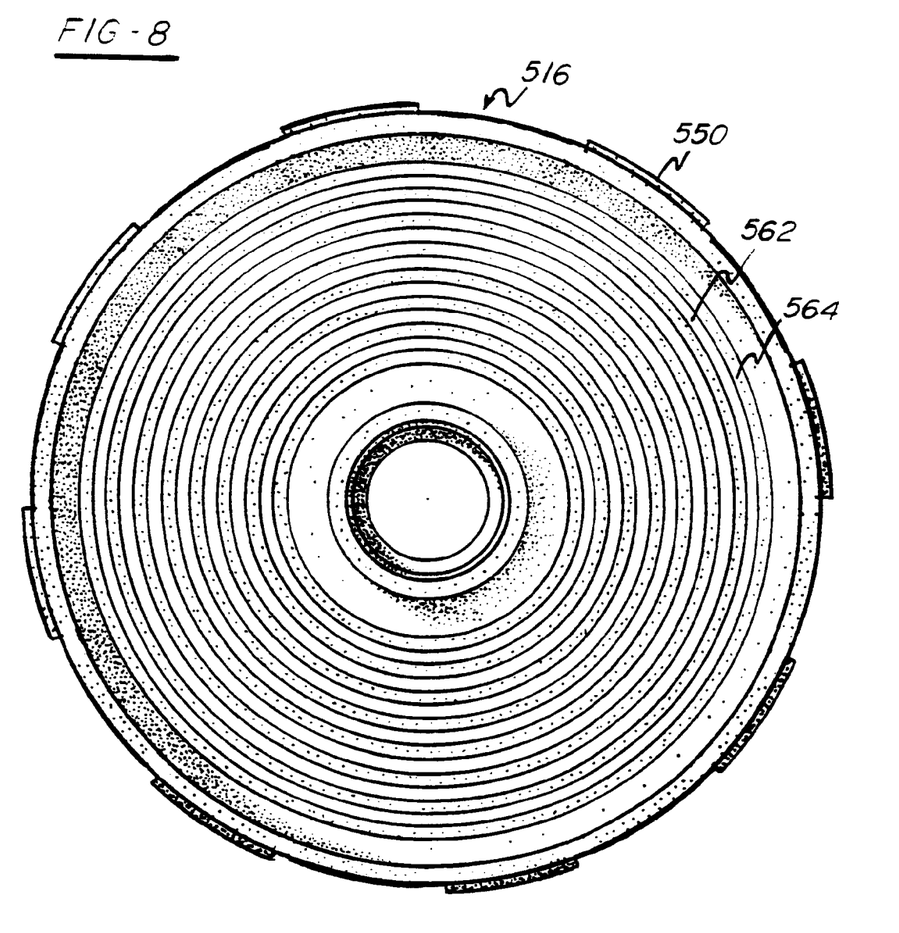
FIG. 8 is a schematic top view of the cap shown in the combination depicted in FIG. 7, showing the top side array of annular openings therein.

With specific reference drawn to FIG. 8, the annular array of openings that are provided on the top of the cap and bottom of the cup are shown. Here, the openings 562 are presented in the form of concentric rings adapted for coaxial alignment with the inner tube 510. Each of the ring shaped openings is separated from its neighboring opening by a ring 564.

Figure 9:
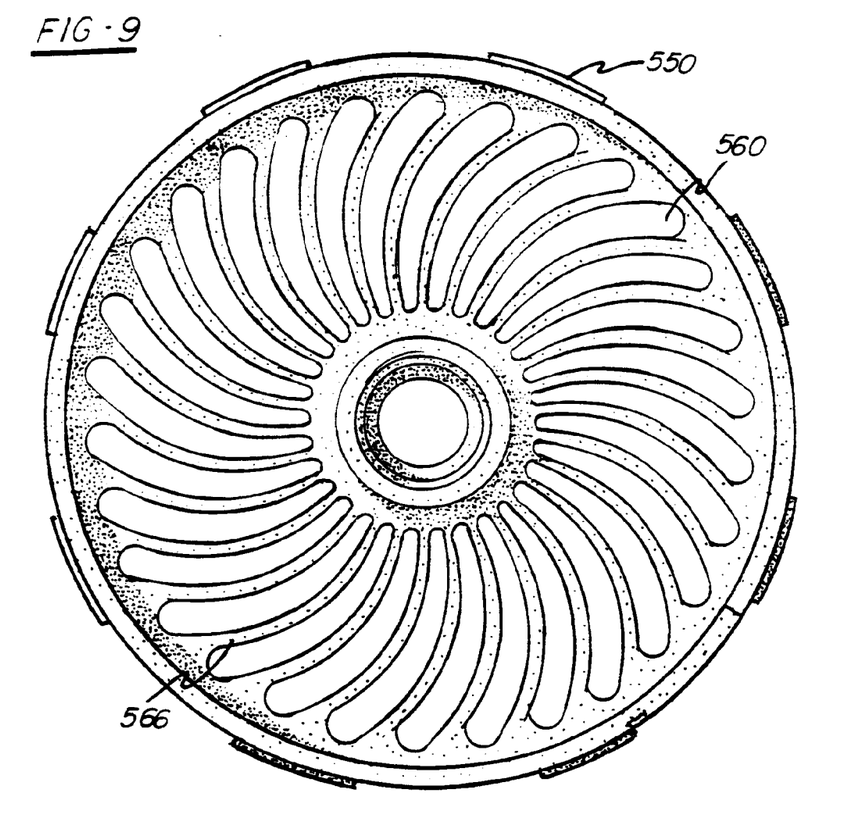
FIG. 9 is a schematic illustration of the bottom side view of the cap shown in FIG. 8, detailing the bottom side array of petal or kidney shaped openings that will be placed adjacent the filter medium.
Figure 10:
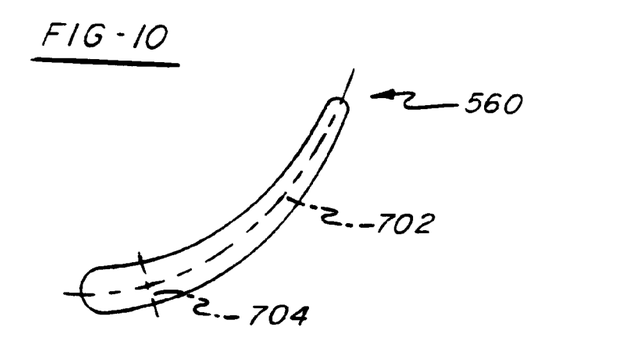
FIG. 10 is a magnified view of one of the petal or kidney shaped openings shown in FIG. 9.

In FIG. 9 the petal shaped arrangement of openings adapted for placement adjacent the filter media is shown. Here petals or kidneys 560 are generally oblong and radially disposed about the axis represented by the inner tube 510. The petals 560 have a major axis 702 extending generally radially and a minor axis 704 transverse to the major axis (FIG. 10). Individual petals or openings 560 are separated from neighboring openings in the array by generally extending ridge members 566. The depth (axial dimension) of the ridges 566 is greater than the depth dimension (axial dimension) of the rings 564.

The bead cage or bi-level arrangement of openings in the cap and cartridge bottom creates a large exposed area against the filter media; thus increasing efficiency and reducing pressure drop. This also creates a reduced area small enough that a bead should not pass through. This reduced area section is not against the filter media and therefore does not reduce its efficiency.

The thickness of the filter retainer is used to create a transition between the larger open area against the filter media and the reduced area that is not against the filter media. The smaller openings do not allow the small beads to pass through, but at the same time, since they are not reducing filter surface area, they do not cause a reduction in filter efficiency and pressure drop.

Various changes or modifications in the invention described may occur to those skilled in the art without departing from the true spirit or scope of the invention. The above description of preferred embodiments of the invention is intended to be illustrative and not limiting, and it is not intended that the invention be restricted thereto but that it be limited only by the true spirit and scope of the appended claims.

What is claimed is:

1. A desiccant cartridge adapted for reception within a canister having a fluid flow tube disposed therein, said cartridge comprising a cup having spaced inner and outer wall portions coaxially disposed and connected by a transverse portion to define a chamber having an opening, said cup having a length X and a top and bottom surface, an outer surface comprising a flange projecting radially outwardly from said outer surface and adapted to provide snug, friction fit of said cartridge within said canister, said flange being located along said length and intermediate said top and bottom surface.

2. The desiccant cartridge as recited in claim 1 wherein said flange is positioned along said length at a position of about 0.2–0.35(X) spaced from said top surface.

3. The desiccant cartridge as recited in claim 2 wherein said flange is positioned along said length at a position of about 0.25(X) spaced from said top surface.

4. A desiccant cartridge adapted for sealing mount on a fluid flow tube, said cartridge comprising a cup having spaced inner and outer wall portions coaxially disposed and connected by a transverse portion to define a chamber, said cup having an axial length and a top and bottom surface, said inner wall defining a sleeve adapted for coaxial reception over said fluid flow tube, said sleeve having a diameter gradually decreasing from said top surface and terminating at an area of maximum constriction positioned intermediate said top surface and said bottom surface, said area of maximum constriction adapted for resilient, snug compressive fit of said fluid flow tube.

5. Desiccant cartridge as recited in claim 4, wherein said diameter of said sleeve decreases from said top surface to said maximum constriction in an amount of about 5%.

6. A desiccant cartridge comprising:
   a cup having spaced inner and outer wall portions coaxially disposed and connected by a transverse portion to define a chamber having an opening, said inner wall portion comprising an outer surface and an inner engagement surface and defining a sleeve having first and second openings, said inner engagement surface having an inner diameter and comprising a midpoint intermediate said first and second openings, said inner diameter characterized by a first inner diameter at said first opening and a second inner diameter between said first and second openings, said sleeve tapering in a direction from said first opening toward said second opening to thereby form a maximum constriction area at said second inner diameter.

7. The desiccant cartridge recited in claim 6, wherein said sleeve tapers by about 5% as measured from said first inner diameter to said second inner diameter.

8. The desiccant cartridge recited in claim 6, wherein said sleeve has a wall thickness measured in a radial direction and wherein said wall thickness at said maximum constriction area is about three times said wall thickness measured at said first opening.

9. The desiccant cartridge recited in claim 6 wherein said maximum constriction area comprises a venturi opening.

10. The desiccant cartridge as recited in claim 9 wherein said sleeve comprises first and second intermediate diameter areas, said venturi opening comprising a throat located between said first and second intermediate diameter areas, said first and second intermediate diameters both being smaller than said first inner diameter but being larger in diameter than said throat.

11. A desiccant cartridge adapted for fit within a receiver dryer or accumulator canister, said cartridge comprising a cup having spaced inner and outer wall portions coaxially disposed and connected by a transverse portion to define a chamber having an opening, said inner wall defining a sleeve having first and second openings, said sleeve being provided with a venturi restriction intermediate said first and second openings.

12. A desiccant cartridge as recited in claim 11 wherein said venturi comprises a throat having a smaller diameter than that of said first opening.

13. A desiccant cartridge as related in claim 12 wherein said throat has a smaller diameter than said second opening.

14. A desiccant cartridge adapted for snug reception within a canister having a fluid flow tube disposed therein, said cartridge comprising:

a cup having spaced inner and outer wall portions coaxially disposed and connected by a transverse portion to define a chamber having a chamber opening, said outer wall having an outer surface and an inner surface, said inner wall portion comprising an outer surface and an inner engagement surface and defining a sleeve having first and second openings, said sleeve adapted to receive said fluid flow tube and said inner engagement surface adapted to secure said desiccant cartridge to said fluid flow tube so as to form a seal between said fluid flow tube and said sleeve, said inner engagement surface comprising a first flange projecting radially inwardly intermediate said first and second openings to form the seal, said outer wall of said cup including a second flange located intermediate said chamber opening and said transverse portion.

\* \* \* \* \*